United States Patent [19]

Griswold et al.

[11] 4,038,124
[45] July 26, 1977

[54] MICROFICHE DELETER METHOD

[76] Inventors: Augustus W. Griswold, 2 Pine Tree Trail, Rush, N.Y. 14543; Boris W. Haritonoff, Pole Bridge Road, Geneseo, N.Y. 14454

[21] Appl. No.: 618,884

[22] Filed: Oct. 2, 1975

Related U.S. Application Data

[62] Division of Ser. No. 327,499, Jan. 29, 1973, Pat. No. 3,927,586.

[51] Int. Cl.² .......................... B31B 1/25; B32B 31/18
[52] U.S. Cl. .......................................... 156/248; 83/8; 83/144; 83/520; 83/530; 83/575; 156/108; 156/250; 156/344; 156/268
[58] Field of Search ............... 156/584, 379, 108, 247, 156/248, 250, 344, 368, 353, 510; 83/7–8, 144, 520, 530, 553, 577, 575, 576, 617

[56] References Cited

U.S. PATENT DOCUMENTS

| | | | |
|---|---|---|---|
| 2,869,748 | 1/1959 | Nerwin et al. | 156/379 |
| 3,410,994 | 11/1968 | Facto | 83/520 |
| 3,469,488 | 9/1969 | Gaspari | 83/6 |
| 3,546,053 | 12/1970 | Goldberg et al. | 156/247 |
| 3,634,176 | 1/1972 | Covert et al. | 156/584 |
| 3,667,334 | 6/1972 | Brunett | 83/577 |
| 3,668,956 | 6/1972 | Whipple et al. | 83/8 |
| 3,780,814 | 12/1973 | Herb | 83/530 |

*Primary Examiner*—Douglas J. Drummond
*Assistant Examiner*—M. G. Wityshyn
*Attorney, Agent, or Firm*—Schovee & Boston

[57] ABSTRACT

A microfiche having one or more frames to be deleted is mounted in accurate registration and alignment on a microfiche deck, and a light is energized in the deck underneath each frame of the microfiche to be deleted. The operator then moves a knife carriage mounted on an "X-Y" detented slide system and having a solenoid-operated knife blade, on top of the microfiche, to the proper position with respect to each frame to be deleted, and then energizes the solenoid to cut that frame from an adjacent frame on the same filmstrip. After each edge of the frame is cut, the operator uses a spatula to pry up an end of the frame which is then grasped and stripped off of the microfiche. After all of the unwanted frames are deleted, the microfiche is removed from the deck.

10 Claims, 7 Drawing Figures

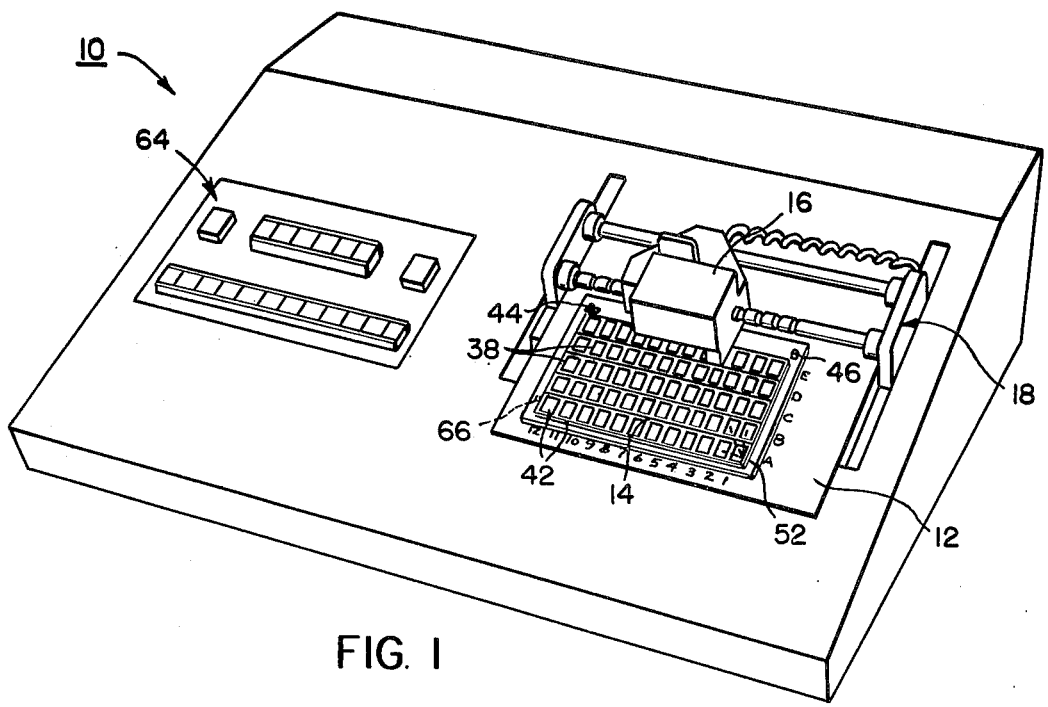
FIG. 1
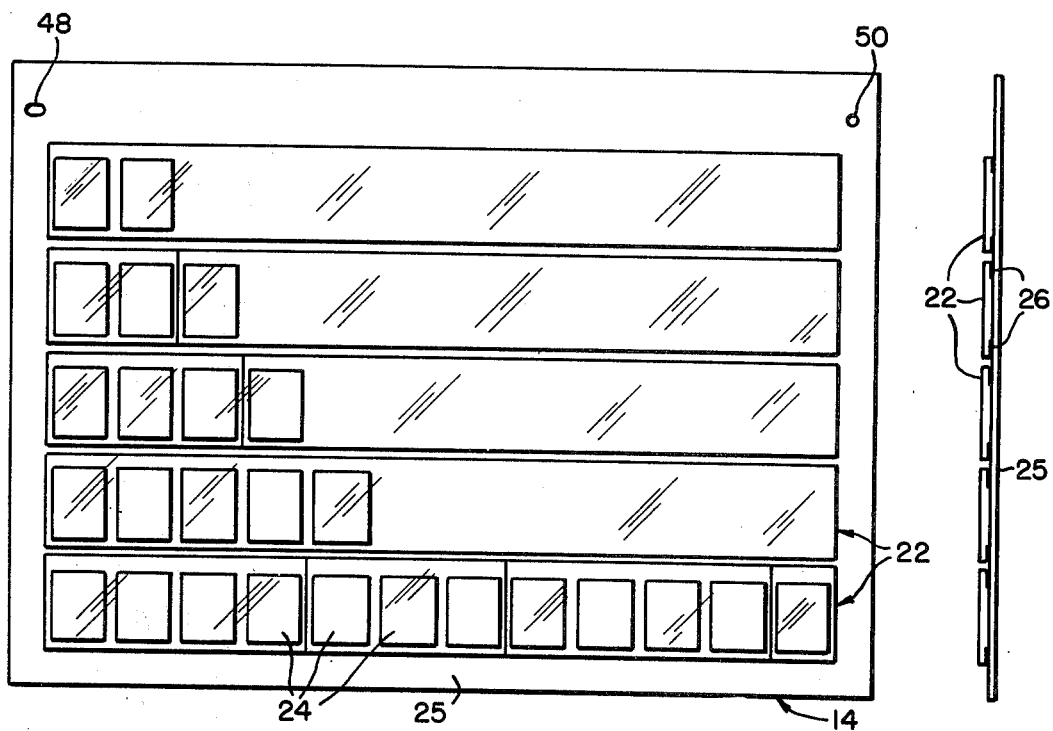
FIG. 2A
FIG. 2B

MICROFICHE DELETER METHOD

REFERENCE TO RELATED APPLICATION

This is a division of application Ser. No. 327,499 filed Jan. 29, 1973 and now U.S. Pat. No. 3,927,586.

BACKGROUND OF THE INVENTION

1. Field of the Invention

This invention relates to microfiche and in particular to a method and apparatus for deleting frames from a microfiche.

2. Description of the Prior Art

In the prior art, when it was found desirable to eliminate certain information provided on a microfiche, it was necessary to prepare an entirely new microfiche and to discard the old microfiche. It is a primary object of the present invention to provide an improved method and apparatus for "deletion updating" a microfiche that is not subject to the disadvantages, such as the expense, of the prior art method.

SUMMARY OF THE INVENTION

The document/image deletion apparatus and method of the present invention provides for the removal of any unwanted frames from a microfiche while leaving the remaining frames of the microfiche intact. According to the present invention, microfiche, of the type having microfilm frames removably mounted on a base (for example, by an adhesive), is updated (where the updating requires only deletion of certain frames) by mounting a microfiche in registration on a deck, moving a knife carriage, including a knife blade, over the deck, by means of an X-Y detented slide system, to properly locate the knife blade with respect to a frame to be deleted, and cutting the frame from the adjacent frame on each side. A spatula is used to pry up the frame, which is then stripped off and discarded. The deck is preferably provided with a rectilinear array of light sources thereunder with one light positioned under each of the frame areas of the microfiche. Prior to the cutting operation, the operator, in response to information in a computer printout, energizes the light source corresponding to each frame to be deleted to identify the frames to be cut out. The knife blade is punched through the microfilm at the edge of a frame by a solenoid. A solenoid-operated fiche lifting pin aids in removing the fiche from the deck, after all of the unwanted frames have been removed from the microfiche.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 1 is an isometric view of the deleter of the present invention;

FIGS. 2A and 2B are plan and side views, respectively, of a microfiche of the type used in the present invention;

DETAILED DESCRIPTION OF THE PREFERRED EMBODIMENT

Figure 3:
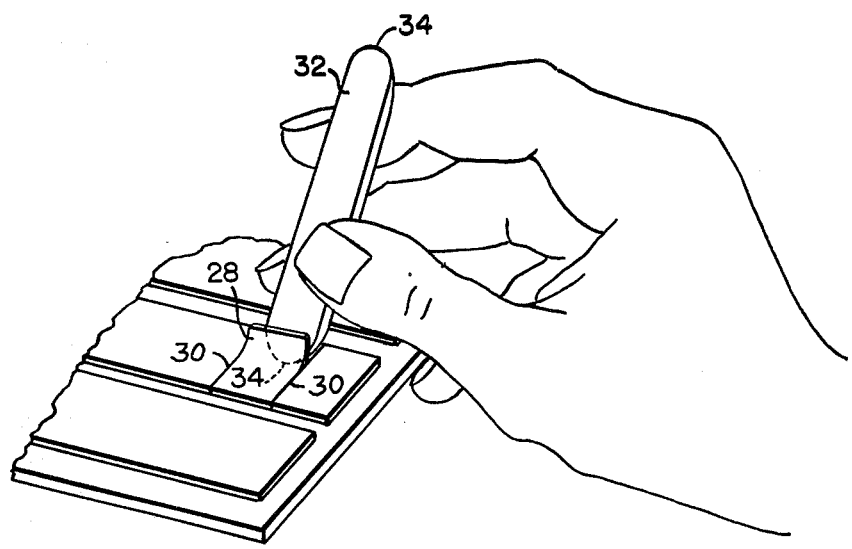
FIG. 3 is an enlarged isometric and diagrammatic view showing the removal of a cut frame from a microfiche.

With reference now to FIG. 1 of the drawings, the deleter 10 of the present invention includes a microfiche deck 12, on which a microfiche 14 is mounted, and a knife carriage 16 movably above the deck 12 by means of an X-Y slide system 18.

Referring to FIGS. 2A and 2B, the deleter 10 of the present invention emmploys a microfiche 14 of the type having microfilm strips 22 (including one or more microfilm frames 24) removably mounted on a base 25, for example, by means of adhesive 26 along each edge of the strips 22.

Referring to FIG. 3, once a frame 28 to be deleted has been separated from the adjacent frames 24 of the strip 22, by slits or cuts 30 made along each side edge thereof by the knife carriage 16, it is removed from the microfiche 14 by hand with the aid of a tool or spatula 32. The spatula 32 is preferably a thin elongated tool having a curved edge 34 that is sharp by virture of a flat top surface and upwardly tapering bottom surface. The spatula 32 is conveniently used to pry up the top edge of each frame 28 to be deleted, which edge is then grasped by hand and the entire frame 28 can then be peeled off and disposed of.

Figure 4:
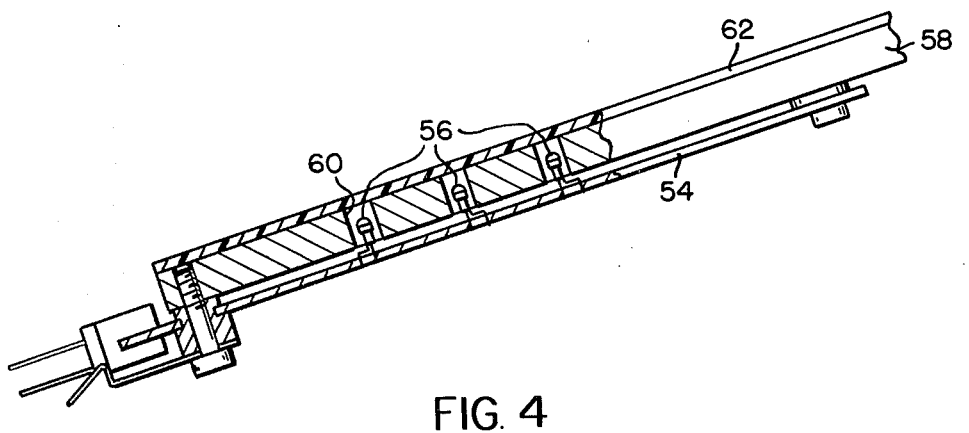
FIG. 4 is a cross-sectional view through the deck of the present invention.

Referring to FIGS. 1 and 4, the deck 12 includes parallel lines thereon (not shown) defining rows corresponding to rows 38 of the strips 22 on the microfiche 14 and parallel lines (not shown) defining columns corresponding to columns 42 of the individual frames 24 on the microfiche 14. The deck 12 also includes legends A-E designating the rows 38 and legends 1-12 designating the columns. A pair of upwardly extending fiche locating pins 44 and 46 cooperate with registration openings 48 and 50 (see FIG. 2) in the microfiche 14 to accurately locate the microfiche 14 in registration and alignment on the deck 12, so that, for example, when cuts are made by the knife carriage 16, the cuts will be in the right place with respect to the individual frames 24.

The deck 12 also includes a light source thereunder for each frame-receiving area 52 thereof (corresponding to each possible frame 24 on the microfiche 14). This is accomplished in the preferred embodiment by providing a printed circuit grid 54 underneath the deck 12, the grid 54 having a rectilinear array of LEDs 56 (light emitting diodes) thereon. The deck 12 preferably includes a metal plate 58 having a cylindrical opening 60 therethrough for each LED. A thin (a few mils thick) sheet 62 of transparent plastic overlies the plate 58.

The deleter 10 includes a data keyboard 64 including one button for each row and one button for each column, so that by pressing the right buttons, the operator can turn on a light (LED) in each area in which a frame is to be deleted. The power supply and circuitry for this is state of the art knowledge and need not be described in detail here. A reset switch for clearing all of the LEDs 56 on the deck can be provided, as well as a test switch to illuminate all of the LEDs prior to using the deleter 10.

The deck 12 also includes a fiche lifting pin 66 (see FIGS. 1 and 6) located beneath the microfiche 14, and a solenoid 68, for use in aiding removal of the microfiche 14 after completion of the deleting operation. When the solenoid 68 is energized after completing a deletion operation, the pin 66 is pushed up lifting one corner of the microfiche 14.

Figure 5:
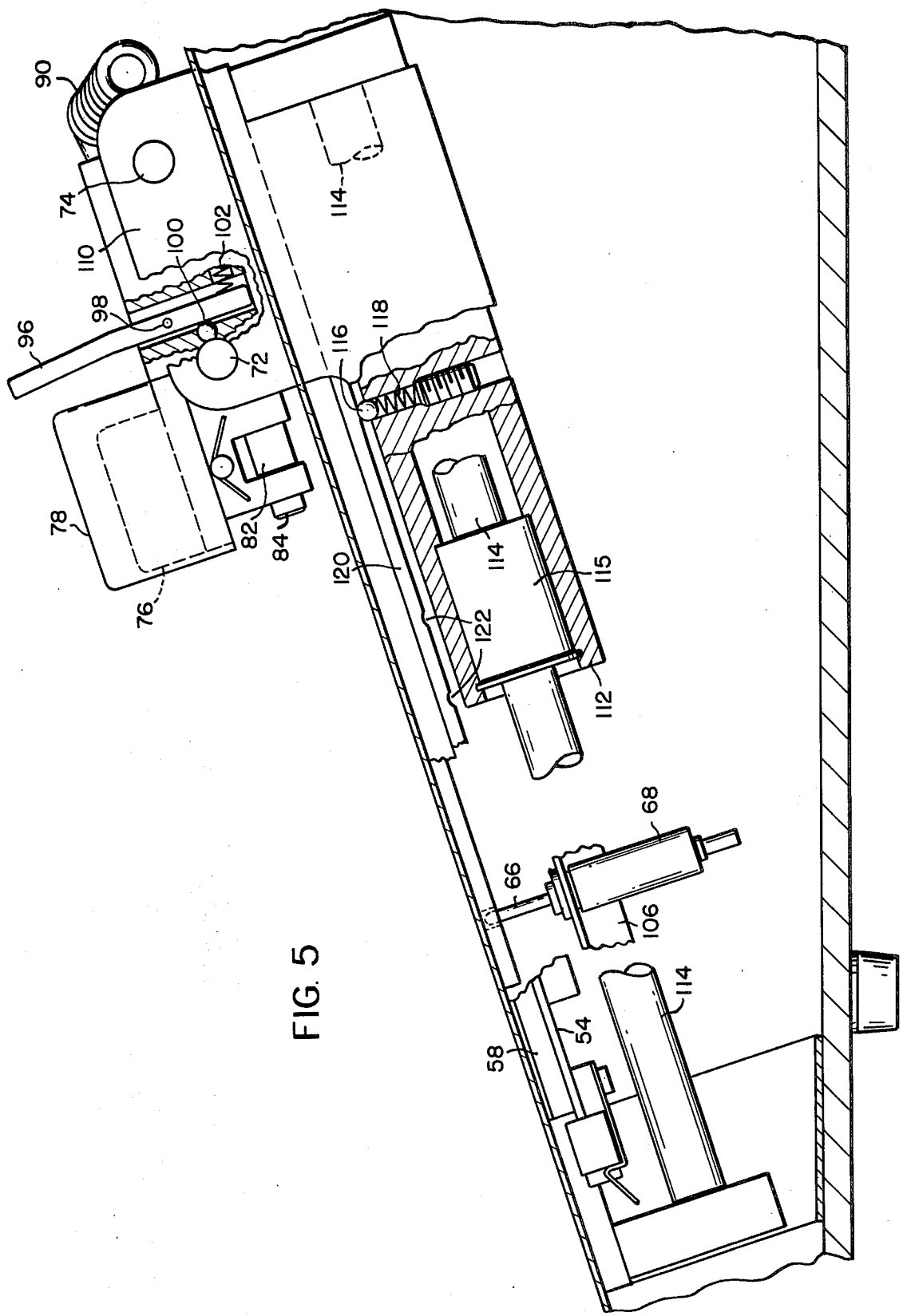
FIG. 5 is a side, partly cross-sectional view through the deleter of the present invention.
Figure 6:
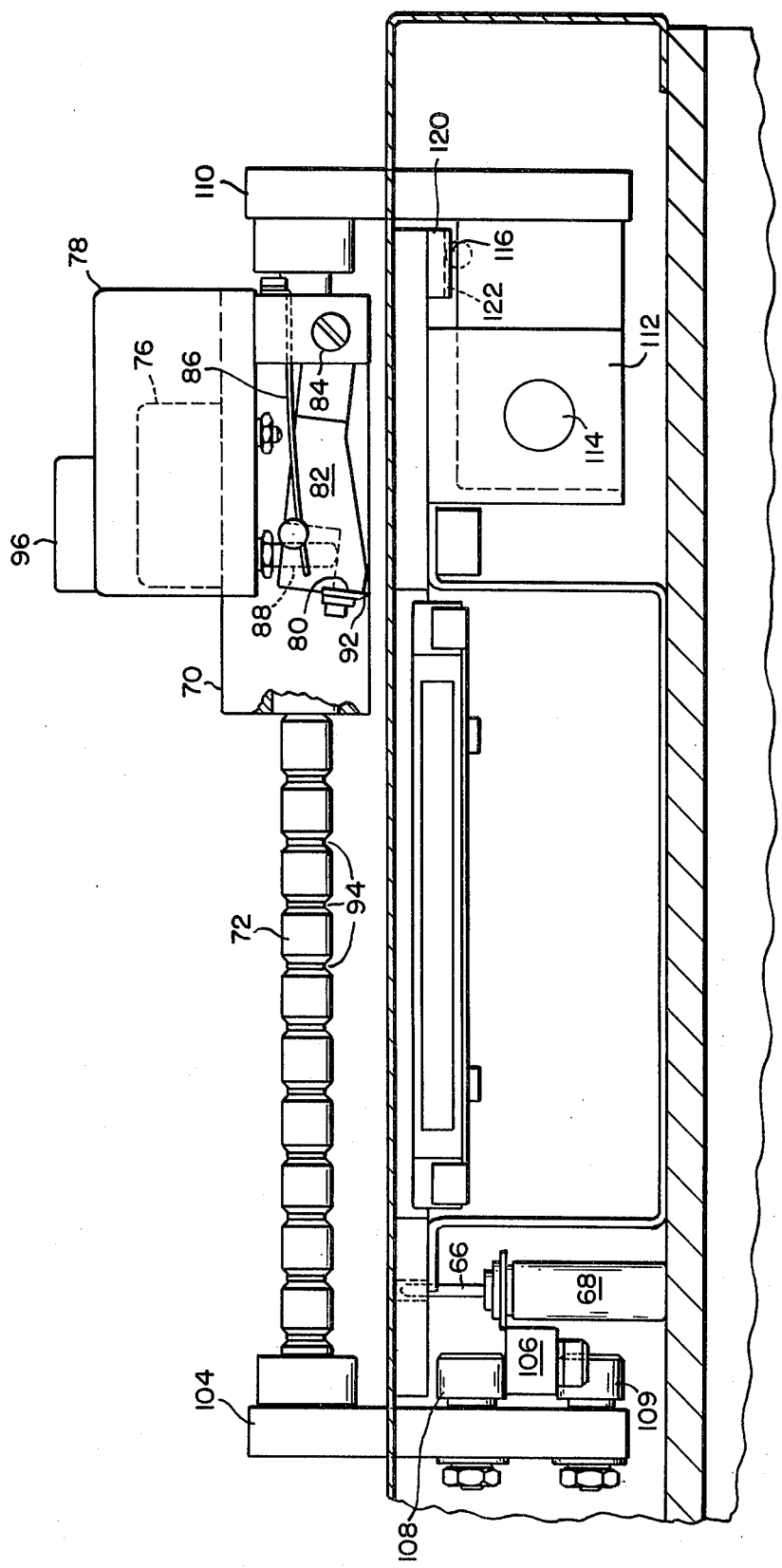
FIG. 6 is a front, partial cross-sectional view through the deleter of the present invention.

The knife carriage 16 (see FIGS. 1, 5, and 6) includes a mounting block 70 slidably positioned on a pair of X slide shafts 72 and 74 (see FIG. 5), a solenoid 76, a solenoid cover 78, and a knife blade 80 (see FIG. 6). The knife blade 80 is connected to a knife mounting block 82 which is, in turn, pivotally connected at 84 to the mounting block 70. A spring 86 is connected to the mounting block 70 and to the knife mounting block 82 for holding the latter up off the deck 12. The solenoid 76 includes a push pin 88 engaging the knife mounting block 82. The solenoid 76 is connected to a power supply (not shown) by a cord 90. The solenoid 76 is energized by a switch (not shown) that is preferably foot operated by the operator. When the solenoid 76 is energized, the push pin 88 pushes the mounting block 82 and the knife blade 80 downwarly cutting, as by punching, through the filmstrip 22 and partially (about one-thousandth of an inch) through the base 25. The depth of cut of the knife blade 80 can be controlled by controlling the amount of electrical energy delivered to the solenoid 76, and an adjustment screw can be provided on the deleter 10 for this feature. The control is preferably by controlling the voltage such as by using a variable voltage divider. The knife blade preferably is not thin and sharp but rather has an edge 92 having an included angle of about 30°, with 15° on each side of the vertical. This relatively dull edge provides excellent punch-type cutting with very long life. The knife blade is slightly longer than the height of the frame to be cut to ensure a complete cut. The knife mounting block can include a pad (not shown) (preferably aluminum) at each end of the knife blade 80 and extending down just below (about 1 mil) the blade edge 92. These pads help to ensure that the cut does not go too deep and cut through the base, by contacting the base and stopping the knife blade just after the frame has been completely cut through.

The knife carriage 16 is provided with detented sliding movement along the X direction as follows. The shaft 72 has equally spaced-apart recesses 94 therein (see FIG. 6). Referring to FIG. 5, the knife carriage 16 can be releasably held at any one of a plurality of predetermined, accurate locations defined by the recesses 94, by means of a detented release lever 96, pivotally connected to the mounting block 70 at 98, a ball 100, and a compression spring 102. As can be seen from the drawing, the spring 102 holds the ball 100 in a recess 94 until the lever 96 is manually forced to its release position allowing the knife carriage to move along the X shafts 72 and 74.

The knife carriage 16 is mounted for sliding movement along the Y direction as follows. Referring to FIG. 6, the two X shafts 72 and 74 are connected on the left (25 viewed in the FIGS.) to side plate 104. A rail 106 parallel to the deck 12 is located under the deck, and a roller 108 that rides on top of the rail 106, and a roller 109 that rides under the rail, are connected to the side plate 104, for supporting the left end of the X shafts 72 and 74 for movement in the Y direction.

The right hand side of the X shafts 72 and 74 are supported for sliding movement as follows. Referring to FIGS. 5 and 6, the shafts 72 and 74 are connected to a side plate 110, which in turn is connected to a bearing block 112 slidably supported on a Y (or vertical traverse) shaft 114 by a pair of suitable bushing 115 (only one of which is shown). The bearing block 112 is provided with a ball 116 and a compression spring 118, with the ball positioned against a detent plate 120 mounted under the deck 12 and provided with a plurality of recesses (or detents) 122. The knife blade 80 is properly positioned in the Y direction when the ball 116 is positioned in one of the recesses 122.

In operation, a microfiche 14 is placed on the deck 12 with the pins 44 and 46 in the openings 48 and 50 of the microfiche, thus properly registering the fiche on the deck. The operator then (in response to information supplied to her) pushes certain buttons on the keyboard 64 to energize a light in each frame-receiving area 52 of the deck 12 that corresponds to a frame 28 in the microfiche 14 that is to be deleted. The operator then moves the knife carriage 16 to the proper position (she can see the knife blade edge 92) to cut each side of edge of a frame 28 to be deleted from any attached adjacent frame (if the frame 28 is at the end of a strip or is already separate from a frame on one side, then only one cut need be made). When the knife carriage 16 is in its detented position, the operator presses a foot pedal energizing the solenoid 76 to drive the knife blade 80 through the microfilm strip 22. After a frame is severed from adjacent frames, the operator uses the spatula 32 to pry up one end of the frame to be stripped off of the base 25, grasps the raised end and peels off the frame and discards it.

While the present invention has been described with reference to the preferred construction, other constructions can be employed. For example, other types of cutting and other types of knives can be used, as well as other types of knife actuators. Two cuts can be made simultaneously on each side of a frame to be deleted, rather than the cuts being made separately. Other means than the spatula can be used to strip off the frame to be deleted, and other means for identifying the frames to be deleted can be used (such as by lights shining down from above the fiche or by putting a mark directly on the frame(s) to be deleted). This invention also will work with other types of removable frames, and is not limited to use only with that type shown using adhesive along both edges.

The invention has been described in detail with particular reference to the preferred embodiment thereof, but it will be understood that variations and modifications can be effected within the spirit and scope of the invention as described hereinabove and as defined in the appended claims.

I claim:

1. A method for preparing an updated microfiche, wherein said microfiche is of the type including a base and a plurality of microfilm frames removably mounted on the base, comprising:
   a. mounting said microfiche on a deck;
   b. providing a separate light under each frame and energizing only those lights under frames to be deleted;
   c. positioning a movable knife carriage, including a knife blade, over said microfiche;
   d. positioning said carriage and knife blade over a frame to be deleted and cutting, with said knife blade, said frame to be deleted from all adjacent frames connected thereto; and
   e. removing said cut frame to be deleted from said base.

2. The method according to claim 1 wherein said carriage includes a single knife blade having a length slightly longer than the height of said frame, and said positioning step comprises positioning said knife blade at one edge of said frame to be deleted, and wherein said cutting step comprises forcing said knife blade, all at one time, directly down onto said frame edge with sufficient force to cut therethrough.

3. The method according to claim 2 wherein said forcing step comprises providing a solenoid on said carriage mounted to cause said knife blade to punch through said frame edge when energized, and energizing said solenoid.

4. The method according to claim 3 including adjusting the depth of cut of said knife blade by adjusting the electrical power supplied to said solenoid.

5. The method according to claim 4 wherein said adjustment comprises adjusting the voltage applied to said solenoid.

6. The method according to claim 1 including energizing all lights corresponding to all frames to be deleted prior to deleting any frame.

7. The method according to claim 1 including mounting said microfiche on said deck in a predetermined accurate registration and alignment by providing said microfiche with registration openings therethrough and providing said deck with upwardly extending registration pins and fitting said pins through said openings and locating said pins in accurate relationship to detents in an X-Y support for said carriage.

8. A method for preparing an updated microfiche, wherein said microfiche is of the type including a base and a plurality of microfilm frames removably mounted on the base comprising:
  a. mounting said microfiche on a deck;
  b. positioning a movable knife carriage over said microfiche;
  c. positioning on said carriage a single knife blade having a length slightly longer than the height of a frame and a solenoid for forcing said knife blade to punch, all at one time, through a frame edge when energized and energizing said solenoid with just sufficient electrical energy to force said knife blade completely through said frame edge but not completely through said base;
  d. positioning said carriage and knife blade over a frame to be deleted and cutting, with said knife blade, said frame to be deleted from all adjacent frames connected thereto; and
  e. removing said cut frame to be deleted from said base.

9. The method according to claim 8 including adjusting the depth of cut of said knife blade by adjusting the electrical power supplied to said solenoid.

10. The method according to claim 9 wherein said adjustment comprises adjusting the voltage applied to said solenoid.

* * * * *

UNITED STATES PATENT AND TRADEMARK OFFICE
CERTIFICATE OF CORRECTION

PATENT NO. : 4,038,124
DATED : July 26, 1977
INVENTOR(S) : Augustus W. Griswold and Boris W. Haritonoff It is certified that error appears in the above-identified patent and that said Letters Patent are hereby corrected as shown below:

In Claim 7, line 8, after "X-Y" insert --slide--

Signed and Sealed this

Twenty-fifth Day of October 1977

[SEAL]

Attest:

RUTH C. MASON
Attesting Officer

LUTRELLE F. PARKER
Acting Commissioner of Patents and Trademarks